Figure 1:
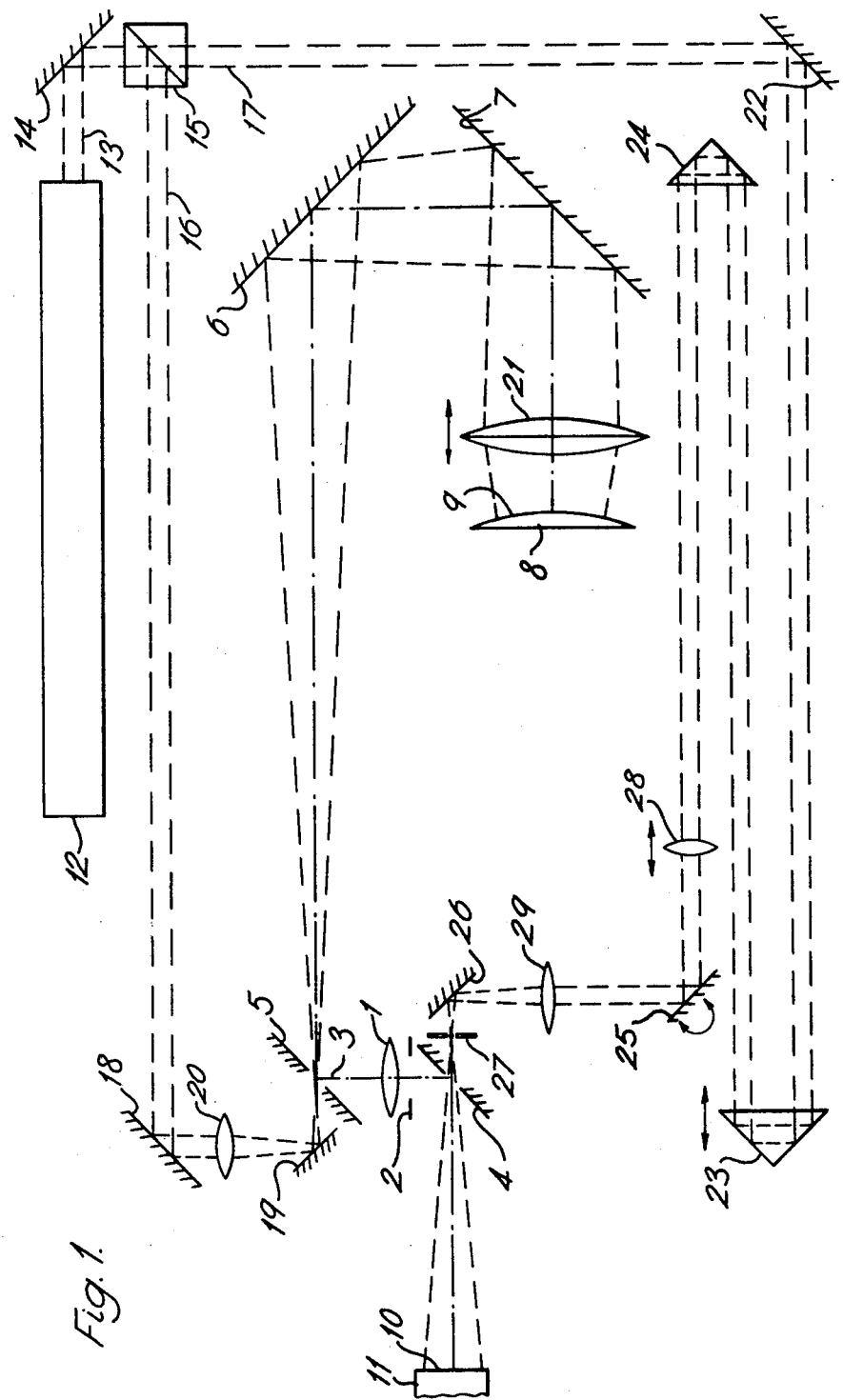

United States Patent [19]

Leendertz

[11] 4,018,531
[45] Apr. 19, 1977

[54] SPECKLE PATTERN INTERFEROMETER

[75] Inventor: Jack Albert Leendertz, Bristol, England

[73] Assignee: National Research Development Corporation, London, England

[22] Filed: Mar. 3, 1975

[21] Appl. No.: 554,698

[30] Foreign Application Priority Data

Mar. 5, 1974 United Kingdom ............... 9794/74

[52] U.S. Cl. ................................. 356/109; 356/113
[51] Int. Cl.² .......................................... G01B 9/02
[58] Field of Search ................. 350/169, 172, 174; 356/106 R, 109, 110, 113

[56] References Cited

UNITED STATES PATENTS

| | | | |
|---|---|---|---|
| 3,673,933 | 7/1972 | Hamann | 350/172 UX |
| 3,740,150 | 6/1973 | Munnerlyn | 356/109 |
| 3,816,649 | 6/1974 | Butters et al. | 178/6.8 |

Primary Examiner—John K. Corbin
Assistant Examiner—Matthew W. Koren
Attorney, Agent, or Firm—Cushman, Darby & Cushman

[57] ABSTRACT

In a "speckle pattern" interferometer a coherent light beam is split into object and reference beams, the former being directed to illuminate a surface under inspection. Light scattered from this surface is imaged at an image location, at which there may be disposed the screen of a television camera device, the imaged light being reflected to the image location by a planar mirror. The reference beam is directed to the image location to interfere with the imaged light, this beam diverging to the image location from an effective point source located behind the mirror through an aperture in the mirror.

8 Claims, 2 Drawing Figures

SPECKLE PATTERN INTERFEROMETER

This invention relates to interferometers of the kind comprising an optical imaging system disposed optically between an object location and an image location, and means for producing from a beam of coherent light separate object and reference beams respectively directed to the object and image locations in such a manner that, when a light-scattering surface is disposed at the object location so as to be illuminated by the object beam and a screen is disposed at the image location so as to be illuminated by the reference beam, light from the object beam scattered by said surface will be imaged on the screen by the imaging system and will interfere at the screen with the light of the reference beam, the reference beam having a smooth wavefront such that at any point on the screen the maximum angle between a ray of the reference beam and a ray of the imaged scattered light will be not greater than the maximum angle between different rays of the imaged scattered light.

It is to be understood that in this specification the term "light" includes ultra-violet and infra-red radiation as well as visible radiation.

Interferometers of the kind specified are particularly adapted for use in inspection systems employing the techniques of electronic speckle pattern interferometry, for example as described by Butters, Leendertz and Denby in Physics Bulletin, Vol. 23 (1972), page 17; further details of some aspects of such systems are disclosed in U.S. Pat. No. 3,816,649. In such a use of an interferometer of the kind specified, a surface to be inspected is disposed at the object location, and there is disposed at the image location the photo-sensitive screen of a television camera device, such as a vidicon tube, by means of which there is derived a video signal representing the point-by-point variations of intensity in the resultant pattern of illumination formed on the screen; because it is partly formed by the imaging of scattered coherent light, this pattern of illumination exhibits the phenomenon known as "speckle effect". By virtue of the form of the reference beam, the range of spatial frequencies in the resultant pattern of illumination will not extend materially beyond the range of spatial frequencies in the "speckle pattern" that would result from irradiation of the screen with only the light scattered from the surface to be inspected. The latter range is of course dependent on the aperture of the imaging system, and the aperture is made sufficiently small to ensure that the spatial frequencies in the pattern of illumination formed on the screen lie wholly or mainly the range which can be resolved by the television camera device; as a typical example, an aperture of f/16 may suitably be used when the television camera device is a standard 2.5 cm. vidicon tube capable of resolving 600 picture lines.

Figure 2:
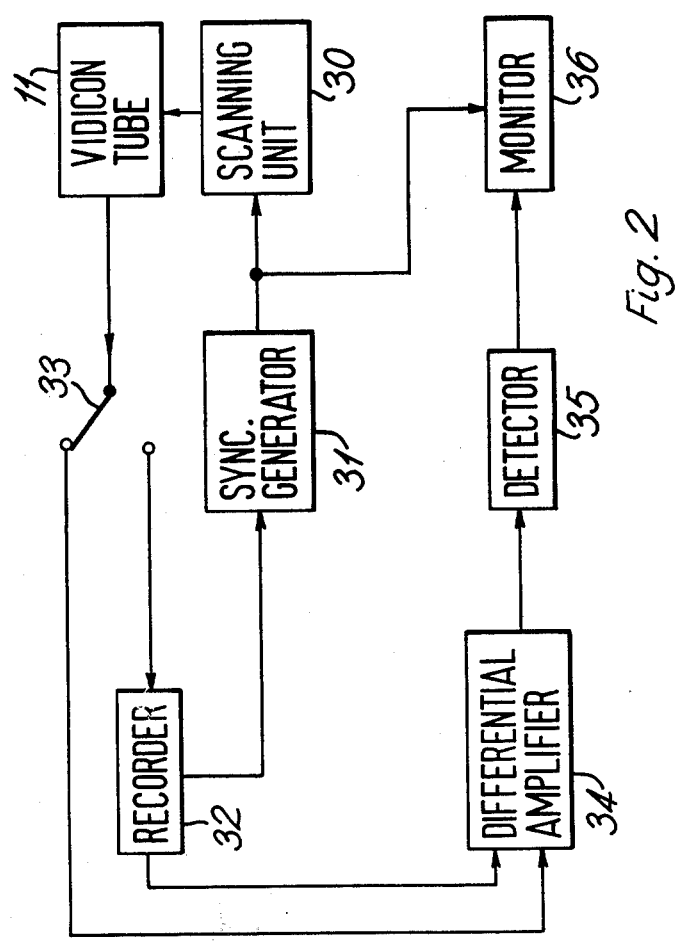

In the documents referred to above there is disclosed a specific form of interferometer of the kind specified, which is particularly described in the aforesaid Specification with reference to FIG. 2 of its drawings. In this interferometer the reference beam is finally directed to the image location by means of a semi-reflecting device disposed between the imaging system and the image location, the scattered light which is imaged by the imaging system being transmitted through this device. This arrangement has been found in practice to have certain disadvantages, particularly in respect of disturbance of the wavefront of the reference beam and distortion of the image formed by the imaging system. It is therefore an object of the present invention to provide an interferometer of the kind specified which is improved in this regard.

According to the invention, in an interferometer of the kind specified light imaged by the imaging system is arranged to be reflected to the image location by a planar mirror and the reference beam is arranged to diverge towards the image location from an effective point source location behind the mirror through a small aperture in the mirror.

Preferably the point source is located at a position optically equivalent to the centre of the aperture of the imaging system.

One embodiment of the invention will now be described by way of example with reference to the accompanying drawings, in which:

FIG. 1 is a diagram illustrating the layout of an interferometer used in a system for the inspection of unpolished lens blanks; and FIG. 2 is a diagram illustrating the arrangement of a television system which forms part of the inspection system.

Referring to FIG. 1, the interferometer includes an optical imaging system comprising a positive lens 1 and an associated aperture stop 2, the optical axis 3 of the imaging system being bent through angles of 90° by virtue of the provision of planar mirrors 4, 5, 6 and 7. The mirrors 4 and 5 are disposed close to the imaging system on opposite sides thereof, and for reasons which will appear from the subsequent description each has formed in it a small aperture whose centre lies on the axis 3; the mirrors 6 and 7 are provided simply in order to ensure compactness in the overall layout of the interferometer. The axis 3 extends between an object location and an image location, and in operation there is disposed at the object location a lens blank 8 having a nominally spherical convex surface 9 which is to be inspected and there is disposed at the image location the photosensitive screen 10 of a vidicon tube 11, the surface 9 and the screen 10 facing optically towards the imaging system. As will be explained more fully below, the inspection system is operative to provide a comparison between the actual form of the surface 9 and a reference form of perfectly spherical shape. Since the system operates by virtue of light scattered from the surface 9, it may be desirable in some cases to enhance the light-scattering properties of this surface by providing it with a thin coat of a metallic paint which can be readily removed after the inspection has been completed.

In operation of the system, illumination is provided by means of a laser 12 which produces a collimated beam of coherent light 13, the laser 12 being adjustable so that the wavelength of the beam 13 may be set at either of two slightly differing values $\lambda_1$ and $\lambda_2$ such that the output power is substantially the same for both wavelengths. The laser 12 may suitably be an argon laser with $\lambda_1$ and $\lambda_2$ being respectively 4965A and 4880A. The beam 13 is deflected by a planar mirror 14 to a beam splitter 15, where it is split into an object beam 16 and a reference beam 17, the beams 16 and 17 being initially collimated and directed perpendicular to each other and the beam splitter 15 being designed so that the beam 16 is much more intense than the beam 17. As will be explained more fully below, the beams 16 and 17 are respectively directed to the object and image locations so as respectively to illuminate the surface 9 and the screen 10.

The beam 16 is deflected through angles of 90° by means of planar mirrors 18 and 19, the latter being disposed behind and perpendicular to the mirror 5, and is caused to converge to a point located between the mirrors 5 and 19 by means of a positive lens 20 disposed coaxial with the beam 16 between the mirrors 18 and 19. The beam 16 diverges from this point through the aperture in the mirror 5, which is shaped so that the beam 16 substantially fills the aperture, and emerges from this aperture with its axis coincident with the axis 3. The beam 16 continues to diverge until it reaches a positive lens 21 disposed in front of the surface 9 with its axis coincident with the axis 3, the power of the lens 21 and its spacing from the surface 9 being such tht the beam 16 is caused to converge towards a point located at or near the nominal centre of curvature of the surface 9. In order to obtain satisfactory results the setting of the lens 21 must be such that the point from which the beam 16 diverges and the centre of the aperture of the stop 2 are conjugate points with respect to the optical system which would be constituted if the surface 9 were replaced at the object location by a specularly reflecting surface having the reference form, so that the optical path length between the two points in question via such a surface would be the same for all points on the surface; the lens 21 is arranged to be movable parallel to the axis 3 so that precise adjustments may be made in this respect. It should be noted that, in order to enable the condition just stated to be met while avoiding undesirable aberration effects that would arise if the illumination of the surface 9 departed too far from normal incidence, it is necessary for the point from which the beam 16 diverges and the centre of the aperture of the stop 2 to be situated at approximately equal optical distances from the object location. If these distances are exactly equal, then for the correct setting of the lens 21 the wavefront of the beam 16 at the object location will exactly match the reference form.

The lens 1 is arranged so as to image on the screen 10 light scattered by the surface 9 from the beam 16. It will be appreciated that in setting the screen 10 relative to the lens 1 account must be taken of the effect of the lens 21, through which the imaged scattered light passes; this effect will, however, be relatively small, since in this respect the lens 21 functions similarly to a magnifying glass disposed close to an object being viewed through it. The size of the aperture in the stop 2 is chosen, having regard to the resolving power of the vidicon tube 11, so as appropriately to restrict the range of spatial frequencies in the speckle pattern resulting from the imaging of the scattered light.

As mentioned above, the screen 10 is also arranged to be illuminated by the reference beam 17, which is arranged to follow a convoluted path in order that at the screen 10 the path lengths for the light from the beams 16 and 17 should be substantially equal. Thus the beam 17 is deflected through an angle of 90° by means of a planar mirror 22, is reflected parallel to itself twice by means of internally reflecting 90° prisms 23 and 24, and is further deflected through angles of 90° by means of planar mirrors 25 and 26, the latter of which is disposed behind and perpendicular to the mirror 4; the prism 23 is arranged to be movable in a direction parallel to the relevant legs of the beam 17, for the purpose of accurate path length matching. Between the mirrors 4 and 26 is disposed a pinhole spatial filter 27, the pinhole being located at a point which is the image in the mirror 4 of the centre of the aperture of the stop 2. The beam 17 is arranged to converge to a point at the pinhole by means of positive lenses 28 and 29 disposed coaxial with the beam 17 respectively before the mirrors 25 and 26; in order to provide for precise adjustment of the point of convergence the lens 28 is arranged to be movable in a direction parallel to the relevant leg of the beam 17. The beam 17 diverges from the pinhole through the aperture in the mirror 4, which is shaped so that the beam 17 substantially fills the aperture, and emerges from this aperture with its axis coincident with the axis 3; provision is made for ensuring precise coincidence between the two axes by arranging for the mirror 25 to be tiltable. It will be appreciated that the arrangement described is such that in diverging from the pinhole to the screen 10 the reference beam 17 does not pass through any component which could give rise to random disturbances of its spherical wavefront; moreover the arrangement does not involve the provision of any optical component which would give rise to distortion of the image of the surface 9 formed on the screen 10.

At the screen 10 the light of the beam 17 interferes with the imaged scattered light to produce a resultant pattern of illumination which is itself in the form of a speckle pattern. The form of the beam 17 is such that at every point on the screen 10 the angles between the relevant ray of the beam 17 and the relevant rays of the imaged scattered light are necessarily smaller than the maximum angle between the rays of the imaged scattered light. The interference will therefore not increase the range of spatial frequencies in the resultant pattern of illumination beyond that determined by the choice of the size of the aperture in the stop 2. It will of course normally be desirable to provide suitable screening to prevent unwanted light reaching the screen 10; this is not shown in the drawing, but appropriate arrangements will be readily apparent to those skilled in the art.

The vidicon tube 11 forms parts of a closed circuit television system, illustrated in FIG. 2, which is operative to enable a comparison to be made between two patterns of illumination successively formed on the screen 10 in the manner described above, the two patterns being derived from the same surface 9 under inspection but respectively using light of the two wavelengths at which the laser 12 is operable. The tube 11 is operated in entirely conventional fashion to provide a video signal representing the point-by-point variations of intensity in the illumination of the screen 10, scanning of the tube 11 being effected by a scanning unit 30 which operates under the control of signals produced by a synchronising signal generator 31; the scanning of the tube 11 is accurately synchronised with the operation of a magnetic disc recorder 32 by arranging for the generator 31 to be locked to timing signals derived from the recorder 32. The video signal derived from the tube 11 is fed to a two-way switch 33 by means of which it may be applied either to the recording head of the recorder 32 or to one input of a differential amplifier 34, the other input of which is connected to the playback head of the recorder 32.

In operation, with the laser 12 set to operate at one of the two relevant wavelengths, the switch 33 is first set to feed the output of the tube 11 to the recorder 32, which is operated in the recording mode so as to record a first video signal derived from the tube 11. The laser 12 is then reset to operate at the other of the relevant wavelengths, the switch 33 is reset to feed the output of the tube 11 to the amplifier 34, and the recorder 32 is operated in the playback mode. There will thus be fed respectively to the two inputs of the amplifier 34 the first video signal reproduced from the recorder 32 and a second video signal derived live from the tube 11, the two video signals being maintained in accurate synchronism by virtue of the locking of the generator 31 to the timing signals derived from the recorder 32.

The output of the amplifier 34, which represents the point-by-point variations in the difference between the two patterns of illumination formed on the screen 10 respectively for the two wavelengths, is an alternating signal whose strength varies in accordance with the discrepancies at different points of the surface 9 between the actual form of this surface and the reference form. In particular, the strength of the signal is zero at instants corresponding to points of the surface 9 where the discrepancy is zero or is a multiple of $\lambda_1 \lambda_2/2$ ($\lambda_1 - \lambda_2$), but is non-zero at instants corresponding to points of the surface 9 where the discrepancy has other values. The output of the amplifier 34 is fed to a detector circuit 35, which preferably incorporates a full wave rectifier, to provide a unidirectional signal which is applied to a cathode ray tube monitor 36 so as to control the point-by-point variations in the brightness of the picture produced by the monitor 36, the monitor 36 being scanned in synchronism with the tube 11 under the control of signals derived from the generator 31. As a result, the picture displayed by the monitor 36 will provide a contour map showing the difference between the surface 9 and the reference form, the contours being constituted by dark lines on a light background and the contour interval being equal to $\lambda_1\lambda_2/2$ ($\lambda_1 - \lambda_2$); this quantity has a value of 14 microns when $\lambda_1$ and $\lambda_2$ are respectively 4965A and 4880A. It should be noted that the picture will be liable to exhibit false contour lines if the conditions specified above in respect of the relationships between the point from which the beam 16 diverges and the centre of the aperture of the stop 2 are not satisfied.

The system described above may be readily modified to provide for the inspection of surfaces having other geometrically simple nominal forms. Thus in the case of a surface having a nominally planar form the lens 21 is replaced by a lens chosen so that the beam 16 will be approximately collimated at the object location, while in the case of a surface having a nominally spherical concave form the lens 21 is dispensed with and the object location is sited in the path of the divergent part of the beam 16 so that its optical distance from the point from which the beam 16 diverges is approximately equal to the nominal radius of curvature of the surface to be inspected. In the case of surfaces having a nominally cylindrical or conical form the lens 21 is replaced by a lens chosen so as approximately to collimate the beam 16, the surface to be inspected is disposed so that its nominal axis is coincident with the axis of this collimating lens, and there is provided a frusto-conical mirror disposed coaxial with the collimating lens at a position such that it reflects an annular bundle of rays of the collimated beam on to the surface to be inspected, the frusto-conical mirror being concave or convex according to whether the surface to be inspected is respectively convex or concave and having an apex angle chosen so that the surface to be inspected is illuminated at or near normal incidence; it will be appreciated that in this case the frusto-conical mirror also serves to reflect back to the imaging system light scattered by the surface under inspection, and that the image of this surface formed on the screen 10 will have an annular shape. As before, in all these cases the precise optical layout should be such that the point from which the beam 16 diverges and the centre of the aperture of the stop 2 are situated at approximately equal optical distances from the object location, and such that these two points are conjugate points with respect to the optical system which would be constituted if the surface to be inspected were replaced at the object location by a specularly reflecting surface having an appropriate reference form.

Interferometers in accordance with the invention may also be utilised in systems employing certain techniques of electronic speckle pattern interferometry other than the two wavelength contouring technique employed in the system described above. In particular they may be utilised in systems designed for the real time study of either surface deformation or surface vibration modes by means of electronic speckle pattern interferometry. In these systems light of only a single wavelength is used, a helium-neon laser normally being a suitable source; further, it is not essential in these systems for the illumination of the surface under inspection to be at or near normal incidence, and for some purposes it may be preferred to arrange the geometry of the interferometer so that the axes of the object beam and the imaging system are not coincident at the object location. Where surface deformation is to be studied, the interferometer is used in conjunction with a television system as described above, the recorded video signal being derived with the surface under investigation in an undeformed state and the live video signal being derived while the surface is undergoing deformation. Where surface vibration modes are to be studied, the interferometer is used in conjunction with a modified television system by means of which a single live video signal is derived while an object under investigation is vibrated, this signal being fed to a monitor via a high-pass filter.

Interferometers in accordance with the invention may also advantageously be employed in certain cases where it is desired to use techniques of speckle pattern interferometry in conjunction with photographic recording. In such cases, of course, a suitable photographic medium will be disposed in use at the image location, in place of the photosensitive screen of a television camera device.

I claim:
1. An interferometer comprising:
   a planar mirror having a small aperture formed therein;
   an optical imaging system disposed optically between an object location and an image location with said mirror disposed in the optical path between said imaging system and said image location, whereby light scattered from a surface disposed at said object location will be imaged by said imaging system at said image location after reflection at said mirror;
   means for producing from a beam of coherent light directed into the interferometer separate object and reference beams;

means for directing said object beam to said object location to illuminate any surface disposed at said object location; and means for directing said reference beam to said image location, including means for shaping said reference beam so that it will diverge to said image location through said small aperture from an effective point source located behind said mirror at a position such that at any point of said image location the maximum angle between a ray of said reference beam and a ray of said imaged scattered light will be not greater than the maximum angle between different rays of said imaged scattered light.

2. An interferometer according to claim 1, in which said point source is located at a position optically equivalent to the centre of the aperture of said imaging system.

3. An interferometer according to claim 1, comprising a further planar mirror having a small aperture formed therein, said further mirror being disposed in the optical path between said object location and said imaging system for reflecting to said imaging system light scattered from a surface disposed at said object location, and said means for directing said object beam to said object location including means for shaping said object beam so that it will diverge towards said object location from a further effective point source located behind said further mirror through the aperture in said further mirror with the axis of said object beam coincident with the optical axis of said imaging system between said further mirror and said object location.

4. An interferometer according to claim 3, in which said further point source and the centre of the aperture of said imaging system are situated at approximately equal optical distances from said object location and are conjugate points with respect to an optical system which would be constituted if there were disposed at said object location a specularly reflecting surface having a form approximating to that of the wavefront of said object beam at said object location.

5. An interferometer according to claim 3, in which said means for directing said object beam to said object location includes means, disposed optically between said further mirror and said object location, for modifying the shape of the wavefront of said object beam.

6. Apparatus for use in optical inspection, comprising an interferometer according to claim 1, and a television camera device having a photosensitive screen disposed at said image location of the interferometer so as to face optically towards said imaging system.

7. Apparatus according to claim 6, further comprising means for correlating two similar video signals derived by means of said camera device and each representing the point-by-point variations of intensity in a pattern of illumination formed on said photosensitive screen.

8. Apparatus according to claim 7, further comprising a laser operative to direct a beam of coherent light into the interferometer, said laser being adjustable so that the wavelength of said beam of coherent light may be set at either of two slightly differing values.

* * * * *